US007790236B2

(12) United States Patent
Vijverberg et al.

(10) Patent No.: US 7,790,236 B2
(45) Date of Patent: Sep. 7, 2010

(54) COATING COMPOSITION

(75) Inventors: Cornelis Adrianus Maria Vijverberg, Halsteren (NL); Martin Bosma, Arnhem (NL); Johannes Wilhelmus Maria Schellekens, Arnhem (NL); Freddy Gerhard Hendrikus Van Wijk, Dieren (NL)

(73) Assignee: Nuplex Resins B.V., Bergen Op Zoom (NL)

( * ) Notice: Subject to any disclaimer, the term of this patent is extended or adjusted under 35 U.S.C. 154(b) by 244 days.

(21) Appl. No.: 11/666,087

(22) PCT Filed: Oct. 25, 2005

(86) PCT No.: PCT/EP2005/055550

§ 371 (c)(1),
(2), (4) Date: Oct. 25, 2007

(87) PCT Pub. No.: WO2006/045808

PCT Pub. Date: May 4, 2006

(65) Prior Publication Data

US 2008/0124474 A1 May 29, 2008

Related U.S. Application Data

(60) Provisional application No. 60/631,229, filed on Nov. 29, 2004.

(30) Foreign Application Priority Data

Oct. 25, 2004 (EP) ................... 04077938

(51) Int. Cl.
*B05D 3/02* (2006.01)
(52) U.S. Cl. .................................... 427/386
(58) Field of Classification Search .................... None
See application file for complete search history.

(56) References Cited

U.S. PATENT DOCUMENTS

| 4,703,101 | A | 10/1987 | Singer et al. |
| 4,764,430 | A | 8/1988 | Blackburn et al. |
| 5,891,981 | A | * 4/1999 | Mauer et al. ........... 528/45 |
| 6,479,151 | B2 | * 11/2002 | Buter et al. ........... 428/413 |
| 6,773,819 | B2 | 8/2004 | Kato et al. |
| 2004/0171867 | A1 | * 9/2004 | Okazaki ........... 560/183 |
| 2006/0281862 | A1 | * 12/2006 | Schellekens et al. ........... 525/124 |

FOREIGN PATENT DOCUMENTS

| EP | 0604922 A | 7/1994 |
| WO | WO 95/27012 A | 10/1995 |

OTHER PUBLICATIONS

Hill, Loren W., "Structure/Property Relationships of Thermoset Coatings", 1991 Joseph J. Mattiello Memorial Lecture, Journal of Coatings Technology, vol. 64, No. 808, May 1992, pp. 29-41.
Murayama, Takayuki, "Dynamic Mechanical Analysis of Polymeric Material", Elsevier Scientific Publishing Company: New York 1978, vol. 1, pp. 1-43.
International Search Report and the Written Opinion of the International Searching Authority mailed Jan. 25, 2006 for PCT/US2005/055550, filed Oct. 25, 2005.

* cited by examiner

*Primary Examiner*—Erma Cameron
(74) *Attorney, Agent, or Firm*—Coraline J. Haitjema; David P. Owen; Howrey LLP

(57) ABSTRACT

The invention relates to a high gloss car wash-resistant coating composition comprising an epoxy-functional binder and a cross-linker reactive with the epoxy groups of the binder and a method to prepare such a car wash-resistant coating. The invention further relates to the use of said coating composition, as a pigment-free top coat or a clear coat, in the finishing and refinishing of articles, for example motorcycles, cars, trains, buses, trucks, and aeroplanes. The coating composition after curing forms a coating having an initial gloss of at least 81 GU and a loss of gloss (LoG) of less than 0.25, the loss of gloss being determined by the formula (I)

$$\text{LoG} = (1-e^{(A/X)}/(1+e^K)+(1-e^{D*\Delta Tg}) \qquad (I)$$

wherein $K=B*(Tg_{onset}-C)$

In formula I $A=-8.03$, $B=-0.21$, $C=328$ and $D=-0.00304$.
X reflects the cross-link density parameter in kPa/K, $Tg_{onset}$ the onset temperature of the Tg transition in K and $\Delta Tg$ the width of the glass transition temperature in K, all three parameters determined in a dynamic mechanical thermal analysis test (hereinafter "DMTA") at 11 Hz and a heating rate of 5° C./min.

18 Claims, No Drawings

COATING COMPOSITION

This application is a 35 U.S.C. §371 national phase application of International Application Number PCT/EP2005/055550, filed Oct. 25, 2005, and claims priority to European Patent Application No. 0407738.1, filed Oct. 25, 2004 and U.S. patent application Ser. No. 60/631,229, filed Nov. 29, 2004, the entire contents of which are incorporated by reference herein.

The invention relates to a high gloss car wash-resistant coating composition comprising an epoxy-functional binder and an acid functional cross-linker reactive with the reactive groups of the binder and a method to prepare such a car wash-resistant coating. The invention further relates to the use of said coating composition as a pigment-free top coat or a clear coat in the finishing and refinishing of articles, for example motorcycles, cars, trains, buses, trucks, and aeroplanes.

An important feature of a coating is the gloss. The gloss of a coating reduces in time, resulting in an unattractive dull surface. In particular, car coatings suffer significantly from a car washing treatment. Hence there is a continuous desire to improve the car wash resistance of coating compositions. Evidently, the desire to improve the washing resistance similarly applies in general, for example to coating compositions for other applications such as motorcycles, trains, etc. Car wash resistance is expressed as a loss of gloss determined in a defined car wash experiment (Renault specification RNUR 2204—C.R. PO No 2204) described below. The loss of gloss is determined by measuring the gloss using reflected light in the method in accordance with ISO 2813.

A coating composition comprising an epoxy-functional binder and a polyacid cross-linker reactive with the epoxy groups of the binder is known from e.g. U.S. Pat. Nos. 4,703,101 and 6,773,819. The prior art coating compositions are formulated to achieve a high cross-link density of the resulting cured coating using a special carboxyl-containing polyester containing unit or units derived from alicyclic polybasic acid and/or alicyclic polyhydric alcohol and which is capable of forming a cured coating having a Universal Hardness (HU) not higher than 500 N/mm². The hydroxyl value of the disclosed epoxyacrylate binder is 77 and the free surplus hydroxyl value (OHVC as defined below) is 31. A disadvantage of the use of binders having a high number of hydroxyl groups is that the coatings obtained are hydrophilic, leading to poor water resistance. Because of this these coatings are not very suitable as car coatings.

It has further been described to make coatings car wash-resistant by including inorganic additives like polysiloxane binders in the coating composition or by using inorganic nanoscopic particles, the nanoscopic particles having a diameter between 1 and 1,000 nm. A disadvantage related to these systems is their difficult and expensive processing and high materials cost. There is therefore a further desire to make car wash-resistant coatings having a high car wash resistance substantially without such inorganic additives.

It is noted that car wash resistance is very different from dry scratch resistance such as disclosed in, e.g., WO 98/40442 and WO 98/40171. Cured coatings optimised to have a very good dry scratch resistance may not have optimal car wash resistance and visa versa.

There is therefore a desire for a coating composition that after curing provides a cured coating, in particular a pigment free top coating, with a good car wash resistance and a high gloss, said coating composition having a simple formulation comprising an epoxy-functional acrylic or polyester binder and an acid- and/or anhydride functional crosslinker and optionally other cross-linkers such as an isocyanate-functional, (hydrolyzable) alkoxysilyl functional crosslinker, a functionalised melamine or aminoplast cross-linker. In particular, there is a desire for a coating composition that can achieve the high car wash resistance at lower cost and substantially without the special additives used in the prior art like polysiloxane binders or inorganic nanoscopic particles.

According to the invention, a coating composition for the manufacture of a car wash-resistant coating is provided which comprises at least one epoxy-functional binder selected from the group of epoxy-functional acrylic binders, epoxy-functional polyester binders and/or di- or higher functional glycidyl ether or ester binders and one or more cross-linkers reactive with the reactive groups of the binder, wherein the binder and cross-linkers are selected such that, after curing of the coating, the coating has an initial gloss of at least 81 GU and a loss of gloss (LoG) of less than 0.25, the loss of gloss being determined by the formula (I)

$$\text{LoG} = (1 - e^{(A/X)}/(1 + e^K) + (1 - e^{D \ast \Delta Tg}) \tag{I}$$

wherein $K = B \ast (Tg_{onset} - C)$

In formula I $A = -8.03$, $B = -0.21$, $C = 328$ and $D = -0.00304$. X reflects the cross-link density parameter in kPa/K, Tg onset the onset temperature of the Tg transition in K and $\sim_{Tg}$ the width of the glass transition temperature in K, all three parameters determined in a dynamic mechanical thermal analysis test (hereinafter "DMTA") at 11 Hz and a heating rate of 5° C./min and wherein, in case the at least one epoxy-functional binder is an acrylic binder, the acrylic binder comprises (1) at least 20 wt% based on the total weight of the monomers of epoxy group-containing monomers and this acrylic binder comprises (2) more than 10 mole % of monomers selected from the group of non-epoxy-functional low Tg monomers with a monomer Tg not exceeding 253K for acrylic non-epoxy-functional monomers, or not exceeding 293 K for methacrylic or non-acrylic non-epoxy-functional monomers, and wherein (3) the acrylic binder has an EEW value of between 200 and 700 g/mol (EEW being the average epoxy equivalent weight), and an OHVC value less than 30 mg KOH/g solid coating.

The inventors have investigated the observed loss of gloss of a coating in a car washing operation (observed loss of gloss defined as: [Initial Gloss−End Gloss]/Initial Gloss), and found that the damage caused by car washing is of mechanical origin and not of chemical origin and is accurately described and determined by the formula (I) using mechanical parameters only. Car wash damage to cured coating compositions was found to be caused by mechanical forces in combination with the presence of dirt particles sticking to the coating surface and/or brought to the coating surface by the use of recycled wash water that still contains tiny, often hard, inorganic dirt particles. In particular in today's car wash installations where plastic brushes are mounted on a revolving head, conditions are quite severe. The brushes hammer on the surface of the coatings, the tiny dirt particles further enhancing the pressure of the impacting brushes through their small surface area (high hardness, sharp edges), causing damage in the coating that is observed as loss of gloss.

It is the inventors' accomplishment to identify those parameters, in particular the cross-link density parameter X, the $Tg_{onset}$ and the width of the glass transition temperature $\Delta Tg$, that uniquely and accurately describe the observed loss of gloss in car washing conditions and their mutual relation as expressed in the mathematical formula (I). The calculated LoG value accurately describes the observed loss of gloss as a result of a car wash treatment as defined below. The formula solves the problem that seemingly contradicting effects on car wash resistance are observed when varying the composition of a car wash-resistant coating composition. E.g., sometimes a high cross-link density (X), appears to be favoured for obtaining a good car wash resistance, whereas on the other hand a high cross-link density (X) may also result in a broad Tg ($\Delta$Tg), which is unfavourable for a good car wash resistance. The invention allows a person skilled in the art to select the coating composition components on the basis of the physical properties of such components in view of achieving selected values on the specified parameters in the cured coating such that the condition in that specified formula is met. Specifically, for making the coating composition a person skilled in the art selects from the wide range of available components those components that after curing result in a balanced combination of a) a relatively low $\Delta$Tg, b) a relatively high cross-link density parameter X, c) a relatively low $Tg_{onset}$ temperature. On the basis of his general understanding of physical properties of chemical compounds, the description of the present invention, and some routine experimentation, the skilled person can choose such components in the coating composition as will result in a relatively low $\Delta$Tg, a relatively high X parameter, and a relatively low $Tg_{onset}$ temperature, and so arrive at the values of the parameters required to meet the formula according to the invention. For example, also a low loss of gloss can be obtained when using certain polymer binder and crosslinker that have a lower crosslink density and hence have a better car wash resistance.

It is emphasized that this good car wash resistance is achieved on the basis of the properties of the polymer network formed by the binder and the crosslinker. Formula I relates to the properties of the network formed by the binder and crosslinker in the coating composition and implies that a LoG of less than 0.25 can be achieved purely on the basis of the network properties even without other components in the coating composition like nanoparticles or polysiloxanes. Components in the coating composition that react with and become part of the network should be included in the evaluation of formula I and II. Components of the composition that do not form part of the network like the nanoparticles or polysiloxane additives should not be included in the evaluation of the formulas. The fact that the coating composition according to the invention requires a calculated LoG (of the cured coating) of less than 0.25 also implies that it has an observed loss of gloss less than 0.25.

U.S. Pat. No. 4,764,430 describes a coating composition based on polyepoxides and polyacid which composition is modified by addition of monocarboxylic acid to improve the appearance of the resulting cured coating particularly regarding to bubble formation. It was found that the coating composition does not result in a coating with the required maximum loss of gloss (see comparative example 4).

The parameters in the formula are not just fit parameters but represent real physical characteristics relating to the internal structure of the coating. A narrow $\Delta$Tg is characteristic for coatings with a homogeneous cross-link network. Characteristic for such a homogeneous network is that the network chains between cross-links are uniform in nature and that the cross-links are homogeneously distributed over the cured coating composition. It was found that a coating comprising only one cross-link network is preferred over a coating comprising two co-existing networks. In view of that, it is also preferred to use binders and cross-linkers that do not provide a significant amount of self-cross-linking in the composition. Preferably, the coating composition according to the invention results in a coating wherein the width of the glass transition temperature of the coating is less than 80K, more preferably less than 70K, even more preferably less than 60K, most preferably less than 50K.

Although a small $\Delta$Tg is generally preferred, it is a merit of the present invention that a low loss of gloss can also be achieved for those coating compositions resulting in coatings having a relatively broad $\Delta$Tg that would otherwise be disqualified for car wash resistance coatings. Using formula (I) according to the invention, the negative effect of the relatively broad $\Delta$Tg can be compensated by choosing the composition of both the epoxy-functional binder and the acid functional crosslinker resin such as to have an adequately a high cross-linking parameter X and a low $Tg_{onset}$ temperature. In this way according to the invention an epoxy-acid coating composition has been made available having a good car wash resistance.

A way to achieve a small $\Delta$Tg is by using either extended glycidyl groups in the glycidyl functional binders or by using extended acid or anhydride groups in the acid- and/or anhydride functional crosslinker. Extended glycidyl and/or acid groups provide extra distance between two polymer chains of the epoxy-functional binders, which, after curing with the cross-linker, will be further apart. An increased distance between two cross-linked polymer chains will result in a more homogeneous polymer network and a small $\Delta$Tg. Because of the fact that extended glycidyl functional acrylic monomers are not easily accessible it is more convenient to modify the crosslinker. Preferably, the acrylic hydroxyl-epoxy-functional binders and/or acid- and anhydride functional crosslinkers, have a large number of atoms between the hydroxyl of the acid group and the acrylic backbone or the branching carbon atom of the crosslinker. This can for example be achieved by chain extension of the acid groups, for example by reacting the binder crosslinker with a chain extender or incorporating a chain extender in the structure of the crosslinker. A homogeneous network, characterised by a narrow $\Delta$Tg, results in an even distribution of the applied mechanical stress over a large fraction of the polymer network chains and thus helps to avoid over-stressed network chains.

It is noted that the binder can be one or more different types of binders, so "the binder" can be read as "the at least one binder". Further, as described above, the crosslinker may be modified with a chain extender. So where reference is made to total solids, this implies the total of the binder, and the cross-linker, optionally modified with chain extender.

The inventors have established that under the acting forces during a car wash test, in principle three different types of scratches can occur in the coating layer: elastic scratches, which disappear immediately after the applied force is removed, and plastic scratches and brittle (fracture) scratches that do not disappear after the applied force is removed. A plastic scratch will have the biggest influence on the amount of scattered light, which is observed as a significant loss of gloss and in general is not appreciated in the known and/or commercial high-gloss coating applications. Elastic scratches do not influence the gloss of the coating and the effect of brittle scratches is in-between. Accordingly, the inventors have established that it is important to reduce the amount of plastic scratches at the expense of an increase in the amount of elastic scratches, or even at the expense of an increase in brittle scratches.

The inventors have noticed that the change of occurrence of plastic scratches during the washing treatment increases with decreasing cross-link density. This increasing change of plastic scratches on decreasing cross-link density is described by the first term on the right-hand side of formula I, that is, by the term: $1-e^{(A/X)}$. If the mobility of the polymeric chains is sufficiently high, part of the occurred plastic scratches can disappear due to a reflow process. The chance of reflow increases with decreasing value of the onset of the glass transition temperature ($Tg_{onset}$). This increasing change of reflow of occurred plastic scratches on decreasing onset of the glass transition temperature ($Tg_{onset}$) is taken into account by the second term on the right-hand side of formula I, that is, by the term: $(1+e^K)^{-1}$. In conclusion, the effect of plastic scratches on the loss of gloss due to the washing treatment can be minimised by increasing the cross-link density of the coating and by lowering the onset of the glass transition temperature ($Tg_{onset}$).

The change of occurrence of brittle scratches during the washing treatment increases with increasing ΔTg (decreasing homogeneity of the cross-link network). This increasing change of brittle scratches on increasing ΔTg is described by the third term on the right-hand side of formula I, that is, by the term: $(1-e^{D*\Delta Tg})$ It is further preferred that the cross-link density parameter X of the cured coating is at least 7 kPa/K, more preferably at least 10 kPa/K more preferably at least 15 kPa/K, even more preferably at least 25 kPa/K, still more preferably at least 30 kPa/K and most preferably at least 35 kPa/K. A high cross-link density can be achieved by increasing the number of epoxy and/or acid groups. Monofunctional compounds (monocarboxylic acids or monoalcohols) reduce the number of reactive epoxy and/or acid groups on the polyepoxy or polyacid and reduce the crosslink density. Although minor amounts of monofunctional can be allowed, depending on the nature and amount of reactive epoxy and/or acid groups on the polyepoxy or polyacid, it is preferred in view of achieving a high cross-link density, that the composition comprises monofunctional compounds in amounts less than 5 wt %, more preferably less than 3 wt % and even more preferably less than 1 wt % (relative to the total solids weight).

It was found that when low polar and low Tg parts are present in the coating composition, a higher cross-linking efficiency can be achieved and thus a higher crosslink parameter X. It is believed that the local mobility in curing the acid-functional cross-linker/binder moiety prolongs the time for the reactive groups on the binder and the cross-linker to find each other and form a covalent bond (cross-link). Another way to increase the cross-link density is by using acid groups that are easily accessible, i.e. not sterically hindered by neighbouring groups. Therefore, flexible, protruding acid or cross-linking groups are preferred for obtaining a high cross-link density. The chemical parameters carbon length (CL), and low polar fraction of low Tg monomers (LPF) as described below can be used to further tune the cross-link density of the cured coating composition to meet the requirement according to formula (I).

As described above, it is furthermore advantageous to have a low value of the onset of the glass transition temperature ($Tg_{onset}$) of the coating to allow reflow of the occurred plastic scratches (that is, make plastic scratches disappear). The inventors have found that the value of $Tg_{onset}$ as determined in a DMTA-test at 11 Hz is a good measure for a coatings reflow ability under car wash conditions. A low value of $Tg_{onset}$ of the cured coating composition can be achieved by introducing local soft spots in the polymer network. For acrylics these soft spots can be introduced using low-Tg, non-functional monomers, and for polyester and/or polyether epoxy-functional binders and crosslinkers these soft spots can be introduced using flexible parts in the polymer chains: using monomers with at least three consecutive hydrocarbons in between the functional groups. Soft spots can optionally be introduced additionally for both acrylic and polyester and/or polyether binder based coating formulations by using an additional cross-linker that has at least three consecutive hydrocarbons in between the groups reactive with the epoxy groups on the epoxy-functional binders or alternatively reactive with hydroxyl groups present in the curing coating composition. These hydroxyl groups will originate as a result from the reaction between the acid groups and the epoxy group, or these hydroxyl groups may be intentionally incorporated in one or more of the binders in the carwash resistant coating composition. Further, the $Tg_{onset}$ can be further tuned by appropriate selection of the low polar fraction of low Tg monomers (LPF) for acrylic binder based coating compositions, and of the carbon length (CL) for polycondensation (polyester) and polyether based coating compositions as described below. Although, in principle, the $Tg_{onset}$ can vary in a wide range as long as the condition of formula (I) is met, the $Tg_{onset}$ (at 11 Hz) is preferably chosen below 350K, more preferably below 330K, even more preferably below 320K, and most preferably below 310K. The $Tg_{onset}$ preferably is at least 275K.

For reasons other than car wash resistance, such as reparability of automotive clear coatings, it is preferred that the $Tg_{onset}$ is at least 275K, more preferably at least 295K, even more preferably at least 310K, even more preferably 320K, and most preferably at least 330K. Depending on the specific application the man skilled in the art can select the optimum value for $Tg_{onset}$ for achieving excellent carwash resistance or e.g. excellent reparability.

In the preferred embodiment of the coating composition according to the invention, resulting in high gloss car wash-resistant coatings, the at least one epoxy-functional binder is an acrylic binder, wherein the acrylic binder (1) comprises at least 20 wt % based on the total weight of the monomers of epoxy group-containing monomers selected from glycidyl (meth)acrylate, (meth)allyl glycidyl ether, 3,4-epoxy-1-vinylcyclohexane, epoxycyclohexyl(meth)acrylate, vinyl glycidyl ether and the like, (2) this acrylic binder comprises more than 10 mole % of monomers selected from the group of non-epoxy-functional low Tg monomers with a monomer Tg not exceeding 253K for acrylic non-epoxy-functional monomers, or not exceeding 293 K for methacrylic or non-acrylic non-epoxy-functional monomers, and wherein (3) the acrylic binder has an weight averaged epoxy equivalent weight (EEW)(on solids) between 200 and 700 g/mol and an OHVC value less than 30 mg KOH/g solid coating.

In view of obtaining sufficient water resistance required in particular for car coating applications, the hydroxyl value (OH-value) of the coating composition, in particular of the binder, is less than 70, more preferably less than 60, even more preferably less than 50 and most preferably less than 40 mgKOH/gr. The inventors have found that good results can be obtained for a coating composition according to the preferred embodiment invention, wherein the at least one binder is an epoxy-functional acrylic binder, if the at least one cross-linker is an acid- and/or anhydride functional crosslinker, optionally also amino-functional cross-linker or a (blocked) isocyanate-functional cross-linker, wherein the binder and the cross-linker together amount to at least 90 wt % of the solids content of the coating composition and give a L value of less than 0.25, L being calculated according to formula (II):

$$L = A1 + A2*Mn + A3*LPF + A4*EEW + A5*CL + A6*AVX + A7*MF + A8*NCO + A9*Mn*CL + A10*Mn*AVX + A11*Mn*MF + A12*(LPF)^2 \quad (II)$$

wherein Mn represents the number average molecular weight of all epoxy-functional binders in the composition, LPF the experimentally determined weight averaged low polar fraction of low-Tg monomers in the acrylic binder, EEW the average epoxy equivalent weight, CL the carbon length, AVX the weight averaged acid value of the acid functional crosslinker, MF the weight fraction of the amino cross-linker on total solids in the coating composition, NCO is defined as the total concentration of NCO groups present in the cured coating composition expressed in mmole NCO groups/g, wherein A1=0.479, A2=0.000932, A3=−28.103, A4=−0.000858, A5=6.788, A6=0.00920, A7=−7.003, A8=0.391, A9=−0.00269, A10=−0.00000343, A11=0.00311, A12=79.122; and wherein the at least one epoxy-functional binder has an EEW value between 200 and 700.

Formula (II) enables the skilled man to select for the formulation of epoxy-acid based coating compositions from the wide variety of possible components those components having the appropriate chemical composition to meet the criterion according to the formula of having a L below 0.25, which accurately corresponds with a low observed loss of gloss of less than 25%.

Coating compositions according to the invention as described above after curing result in a coating having a high gloss of at least 81 GU and an observed loss of gloss of less than 0.25 after the defined car washing treatment even without the special additives that are known in the prior art to produce an improved car wash resistance. Even better car wash resistance can be obtained in the coating composition according to the invention. Preferably, the observed loss of gloss of the cured coating is less than 22%, even more preferably less than 20, still more preferably less than 18%, even still more preferably less than 16%, and most preferably less than 14%. In the best embodiments of the coating composition according to the invention an observed loss of gloss of less than 10% can be achieved. These very low observed loss of gloss values are achieved by tuning the composition parameters X, $Tg_{onset}$ and $\Delta Tg$ according to the formula (I) to meet the corresponding calculated LoG value.

Although the special additives are not required to achieve the above-mentioned high car wash resistance with low loss of gloss, they may in principle be present in the coating composition to further improve the car wash resistance. However, it is nevertheless preferred that the coating composition according to the invention is substantially free of such additives. In particular, is preferred that the coating composition is substantially free of polysiloxane binders and/or of nanoscopic particles, in particular inorganic nanoscopic particles. As the envisaged use of the coating composition is primarily in clear coatings, it is further preferred that the coating composition is also substantially pigment-free. The coating composition according to the invention preferably is substantially siloxane-free and/or substantially acrylosilane-free and inorganic nanoscopic particles-free (less than 0.1 wt %) and still gives good car wash resistance. Substantially siloxane-free and substantially acrylosilane-free means that the amount of siloxane and acrylosilane compound is less than 5 wt %, preferably less than 3 wt %, more preferably less than 2 wt %, most preferably less than 1 wt % on the total coating composition. Substantially pigment-free means that the coating composition comprises substantially no pigment particles and/or substantially no aluminium particles, preferably less than 2 wt % on total composition, more preferably less than 1 wt %, even more preferably less than 0.5 wt %, and most preferably less than 0.3 wt %.

In view of ease of use in applying the coating compositions to a substrate to form a coating, it is a preferred that the coating composition is a liquid.

The invention further relates to suitable binders for use in the above coating composition as described in this application, where these binders are used in an amount of 40 to 90, preferably 50 to 80 wt %, more preferably 50 to 75 wt %, the weight percentages being based on binder+cross-linker=100 wt %.

A preferred coating composition is one wherein L is smaller than 0.22, more preferably L is smaller than 0.20, even more preferably L is smaller than 0.18, still more preferably L is smaller than 0.16, and most preferably L is smaller than 0.14.

Definitions of Parameters

The tensile storage modulus E' and the temperature at which this modulus reaches a minimum value are determined using dynamic mechanical thermal analysis (DMTA) measuring a free-standing cured coating with an average layer thickness between 30 to 50 μm and a standard deviation of the layer thickness less than 2 μm. To obtain a fully cured coating it is preferred that the coating is cured at a temperature of at least 60° C. DMTA is a generally known method for determining characteristics of coatings and is described in more detail in T. Murayama, *Dynamic Mechanical Analysis of Polymeric Material* (Elsevier: New York 1978) and Loren W. Hill, *Journal of Coatings Technology*, Vol. 64, No. 808, May 1992, pp. 31-33. More specifically, DMTA is performed using a modified Rheovibron (Toyo Baldwin type DDV-II-C) at a frequency of 11 Hz with a dynamic tensile strain of 0.03%. The temperature is varied between −50° C. and 200° C. at a heating rate of 5° C./min. All measurements are done in the tensile mode and at each temperature the tensile storage modulus E', the tensile loss modulus E", and tan-δ (tan-δ=E"/E') are determined. In the glass transition region E' decreases sharply. At temperatures above the glass transition temperature Tg but below the rubber to liquid transition temperature T-flow, E' has a local minimum ($E'_{min}$) at a temperature ($T_{min}$ in K), after which it increases with the temperature. The cross-link density parameter X is the ratio between this minimum tensile storage modulus $E'_{min}$ and temperature $T_{min}$ ($X=E'_{min}/T_{min}$) at which this modulus $E'_{min}$ is reached.

The value of the glass transition temperature (Tg), the width of the glass transition temperature ($\Delta Tg$) and the onset of the glass transition temperature ($Tg_{onset}$) are obtained by fitting the experimental data of the loss factor (tan-δ) as a function of temperature with a double Gaussian curve:

$$\text{Tan} - \delta(T) = y_0 + K_1 \cdot \text{Exp}\left[-\frac{(T-T_{g1})^2}{2 \cdot w_1^2}\right] + K_2 \cdot \text{Exp}\left[-\frac{(T-T_{g2})^2}{2 \cdot w_2^2}\right]$$

wherein $y_0$, $K_1$, $T_{g1}$, $w_1$, $K_2$, $T_{g2}$, $w_2$ are constants and tan-δ (T) is the experimental data of tan-δ as a function of temperature T. In the fitting routine, the upper limit of the value of $K_2$ is $K_1/2$.

The temperature at which the fitted tan-δ curve (given by the formula above) reaches a maximum is taken as the glass transition temperature $T_g$. The value of $\Delta T_g$ is the width (in ° C.) of the fitted tan-δ peak at half height.

The $Tg_{onset}$ is the temperature, lower than the Tg itself, where the value of the (fitted) Tan-d equals 0.25× the value of the (fitted) maximum of Tan-d.

The layer thickness of the cured coating samples is determined using an inductive thickness gauge (Isoscope® MP, Fischer Instrumentation). The thickness is determined in at least five different spots on the sample and the average thickness is taken. The thickness of cured coatings that were too soft to prevent penetration of the measuring probe of the Isoscope® MP Instrument was checked by measuring the weight of the sample using a micro-balance (Mettler Toledo® AT201).

The acid functional cross-linkers can contain carboxylic acid functional groups, carboxylic acid anhydrides groups (anhydrides) or both. The acid value (AVX) is the experimental acid value determined in equivalent milligrams of KOH in 1 gram of solid acid functional crosslinker in accordance with ISO 3682-1996. The AVX for anhydride and acid/anhydride functional crosslinkers is the sum of the acid value of the acid groups as described above plus the acid value of the anhydride groups after hydrolysis divided by a factor two. This means that one mmol of anhydride groups equals one mmol of acid groups. The AVX of anhydride and acid/anhydride functional crosslinkers is determined in equivalent milligrams of KOH in 1 gram of solid crosslinker in accordance with ISO 3682-1996.

The molecular weight distribution is determined using gel permeation chromatography (GPC) on a PI gel 5 μm Mixed-C column (from Polymer Laboratories) with tetrahydrofuran as the eluent. The weight-averaged molecular weight (Mw), the number average molecular weight (Mn), and the polydispersity Mw/Mn are determined from the measured molecular weight distribution calculated relative to a polystyrene standard.

If more than one epoxy-functional binder is used, the Mn value for the car wash-resistant coating composition is calculated by taking the weight fractions of the binders based on binder solids (i.e. not taking the cross-linker into account). If $\beta A$ denotes the weight fraction of epoxy-functional binder A and $\beta B$ denotes the weight fraction of epoxy-functional binder B, etc. of a car wash-resistant coating composition containing two or more different epoxy-functional acrylic binders, such that $\beta A + \beta B + \ldots = 1$, the Mn value of the car wash-resistant coating composition is then calculated as: $Mn = \beta A \cdot MnA + \beta B \cdot MnB + \ldots$, where MnA and MnB, etc. denote the Mn values of binders A and B, respectively.

The carbon length (CL) of the acid and/or anhydride functional crosslinkers is the weight fraction on total solids in a car wash-resistant coating composition of all carbon atoms of the acid or anhydride functional cross-linkers and other crosslinkers (e.g. isocyanate functional crosslinkers) present in the form of hydrocarbon moieties containing at least four ($\geq 4$) consecutive carbon atoms in a continuous acyclic alkyl or alkylene chain, as measured across the longest possible path counted per monomer unit and per cross-linker unit. The parameter CL is expressed as a fraction (i.e. number of 0 to 1). The Carbon Length (CL) can be calculated using:

$$CL = \Sigma i 12 \cdot n_i \cdot w_i / M_i$$

Wherein:

$n_i$ = number of consecutive carbon atoms according to the definition in monomer or crosslinker (or optionally chain extender) I, and epoxy-functional acrylic binders $w_i$ = weight fraction of monomer or crosslinker (or optionally chain extender) i in the coating composition (binder, crosslinker and optionally chain extender)

$M_i$ = molecular weight of the monomer or crosslinker (or optionally chain extender) before polycondensation.

The sum is taken over all monomers, crosslinkers and optional chain extenders in the coating composition. For example, in epsilon-caprolacton n equals 5. In the formulas it is defined that all amino-based crosslinkers have zero carbon atoms according to the definition (n=0).

The amino cross-linker concentration (MF) is defined as the weight fraction of melamine cross-linker on total solids in the car wash-resistant coating composition. The parameter MF is expressed as a number of 0 to 1.

The total amount of urethane groups or urethane-forming groups in the coating composition (NCO) is defined as the total concentration of NCO groups present in the cured coating composition expressed in the mmol urethane NCO groups per gram, wherein for the calculation of the concentration the molar mass of the NCO group (42) is taken, irrespective of whether the NCO group is present as a urethane, a urea, an allophanate etc. To avoid any doubt, urethane groups and urethane-forming groups optionally present in the acid functional crosslinker participate in the determination of the value of NCO. NCO groups may be present in the coating composition through the isocyanate-functional cross-linker and optionally in the glycidyl functional binder and/or acid functional crosslinker.

The weight-averaged epoxy equivalent weight (EEW) is defined as the number of grams for 1 mole of epoxy groups in the epoxy-functional binder if more than one epoxy-functional binder is used, the EEW value for the car wash-resistant coating composition is calculated by taking the weight fractions of the epoxy-functional binders based on binder solids (i.e. not taking the cross-linker(s) into account). If $\beta_A$ denotes the weight fraction of epoxy-functional binder A and $\beta_B$ denotes the weight fraction of epoxy-functional binder B, etc. of a car wash-resistant coating composition containing two different epoxy functional binders, such that $\beta_A + \beta_B + \ldots = 1$, the EEW value of the car wash-resistant coating composition is then calculated as:

$$EEW = 1/(\beta_A \cdot (1/EEW_A) + \beta_B \cdot (1/EEW_B) + \ldots)$$

The weight-averaged fraction of low-Tg monomers (LPF) in the acrylic binder is determined as follows: The fraction of non-functional low-Tg monomers f is calculated as the weight fraction of low-Tg monomers per epoxy-functional binder. If more than one acrylic binder is used for each of these epoxy-functional binders, the fraction f is calculated. The weight-averaged fraction of low Tg monomers (LPF) for the car wash-resistant coating composition is then calculated as $LPF = \alpha_1 \cdot f_1 + \alpha_2 \cdot f_2 + \ldots$, where $\alpha_1$, $\alpha_2$, etc denote the weight fractions on total solids in the car wash-resistant coating composition of binders 1, 2, etc., respectively, and $f_1$ and $f_2$ denote the fraction of low-Tg monomers in binders 1, 2, etc., respectively. It is noted here that total solids includes the at least one binder including optional chain extender and the cross-linker. In this case $\alpha$ is used to indicate the weight fraction.

The free surplus hydroxyl value of the coating composition, OHVC is defined as follows:

$$OHVC = (P-Q) \times 56.1 \text{ mg KOH/g solid coating}$$

where

P = amount of free hydroxyl groups in coating composition (based all binders and all crosslinkers) in mmole OH per gram solid coating. By free hydroxyl groups is meant hydroxyl groups present before curing. I.e. the hydroxyl groups that will result from the epoxy-acid reaction are not included.

Q = amount of non-acid functional groups reactive with hydroxyl groups in mmole per gram solid coating (based on all binders and all crosslinkers)

For the sake of clarity we define that for butylated amino resins there are 6.5 mmole reactive groups per gram solid amino resin and for methylated amino resins there are 10.0 mmole reactive groups per gram solid amino resin.

The-Epoxy-Functional Binder

The epoxy-functional binder may be an acrylic or a glycidyl-functional polyester or polyether binder. Also a mixture of epoxy-functional acrylic and/or polyester/polyether binders may be used.

Epoxy-Functional Acrylic Binder

In this patent application the term acrylic binder refers to a binder comprising (meth)acrylic monomers. By (meth) acrylic are meant (meth)acrylate and (meth)acrylic acids well as vinyl esters.

Acrylic resins are based on glycidyl (meth)acrylate, 3,4-epoxycyclohexylmethyl (meth)acrylate, allyl glycidylether.

The acrylic binder of the coating composition according to the present invention preferably has a glass transition temperature of between 230K and 350.

The acrylic binder of the coating composition according to the present invention preferably comprises at least 20 wt % based on the total weight of the monomers of epoxy group-containing monomers.

Additionally, the epoxy-functional binder may contain hydroxyl group-containing monomers or hydroxycycloalkyl group containing monomers. The calculated amount of free surplus hydroxyl groups present in the coating composition before curing must be limited in order to prevent a poor moisture resistance of the carwash resistant cured coating. It is therefore required that the OHVC value must be less than 30 mg KOH/g solid coating, preferably OHVC must be less than 25 mg KOH/g solid coating, more preferably OHVC must be less than 20 mg KOH/g solid coating, even more preferably OHVC must be less than 15 mg KOH/g solid coating, most preferably OHVC must be less than 10 mg KOH.g solid coating. It is possible to use more additional crosslinker reactive with free hydroxyl groups present in the coating composition, yielding a negative number for OHVC. In the latter case this implies additional crosslinker groups reacting with hydroxyl groups formed during the curing reaction of acid groups with epoxy groups.

The acrylic binder of the coating composition according to the present invention further preferably comprises more than 10 mole % of monomers selected from the group of non-epoxy-functional low-Tg monomers with a monomer Tg not exceeding 253K for acrylic non-epoxy-functional monomers, or not exceeding 293K for methacrylic or non-acrylic non-epoxy-functional monomers.

The acrylic binder further preferably comprises monomers not containing epoxy groups and having a Tg higher than 253K for acrylic-type monomers and higher than 293K for methacrylic monomers such as methyl acrylate, tert. butyl acrylate, isobornyl acrylate, isobutyl methacrylate, methyl methacrylate, iso-butyl methacrylate, tert.-butyl methacrylate, cyclohexyl methacrylate, isobornyl methacrylate, acrylic acid and methacrylic acid.

The acrylic binder optionally comprises non-(meth)acrylate monomers such as styrene, vinyl toluene, vinyl esters of branched monocarboxylic acids.

Optionally, a minor amount of the acrylic binder may be modified. In a preferred modification, less than 10 wt % of the acrylic monomers is modified by reaction with a polyisocyanate compound, for example isophorone diisocyanate, hexamethylene diisocyanate, 2,4,4-trimethyl hexamethylene diisocyanate, 4,4'-dicyclohexylene diisocyanate methane, 2,4- and 2,6-toluene diisocyanate, and biurets, isocyanurates, uretdiones, allophanates, and iminooxadiazine diones of these isocyanates.

As described above, it is preferred to have a certain number of atoms between the crosslinked chains. To achieve this, the acid functional crosslinker is preferably reacted with a chain extender. This chain extender comprises a compound reactive with the acid group of the crosslinker, resulting in a new acid functionality or epoxy reactive functionality at a position further from the backbone than before the chain extension. Suitable chain extenders are lactones, such as caprolactone, valerolactone, and butyrolactone, hydroxyl-functional C2-C18 acids such as hydroxypivalinic acid, dimethyl propionic acid, lactic acid, hydroxystearic acid, and the like, and epoxide-functional compounds, such as monoepoxy compounds comprising ethylene oxide, propylene oxide, and glycidyl esters of monocarboxylic acids. Suitable examples include caprolactone, ethylene glycol, propylene glycol. Alternatively, the number of atoms between the backbone and the oxygen atom of the hydroxyl group can be increased by modification of the OH-groups of the OH-functional monomers, followed by (co)polymerisation. The same chain extenders as mentioned above can be applied.

The degree of protrusion of the acid functional groups can be expressed as the average number of atoms between the polymeric backbone and the group. The number of atoms between the oxygen atom of the group and the polymeric backbone needs to be expressed as an average number.

The epoxy-functional acrylic binder comprises a substantial amount of low polar monomers. This amount should at least be 10 wt %, preferably at least 20 wt %, more preferably at least 30 wt % of the total weight of the monomers. Low polar monomers are monomers selected from the group of acrylates, methacrylates and vinyl esters having an oxygen content of less than 25 wt %. Examples of suitable apolar monomers include butyl(meth)acrylate, 2-ethylhexyl(meth) acrylate, lauryl(meth)acrylate, isobutyl(meth)acrylate, nonyl-(meth)acrylate, decyl(meth)acrylate, α-olefins, vinyl esters of α,α-branched monocarboxylic acid (C9-C10) such as VeoVa® 9 and VeoVa® 10 ex Resolution.

As indicated above, the acrylic binder also comprises monomers without a epoxy functionality that when homopolymerised would yield a homopolymer with a low glass transition temperature (Tg), i.e. a homopolymer with a glass transition temperature below 293K for methacrylic or non-acrylic monomers or a homopolymer with a glass transition temperature below 253K for acrylic monomers. These monomers will herein be called "non-epoxy-functional low-Tg monomers".

The glass transition temperature of homopolymers of monomers can be found in handbooks. This Tg and thus low Tg monomers can be found in, e.g., J. Brandrup and E. H. Immergut, (Eds.), *Polymer Handbook*, $3^{rd}$ Edition, VI, pp. 209-277, John Wiley & Sons (New York: 1989) and D. W. Van Krevelen, *Properties of Polymers*, Elsevier (Amsterdam: 1990) chapter 6.

Further improved car wash resistance properties can be obtained by using an acrylic binder wherein more than 12 mole % of the monomers are selected from the group of non-OH-functional low-Tg monomers with a monomer Tg not exceeding 253K for acrylic non-OH-functional monomers, or not exceeding 293K for methacrylic or non-acrylic (e.g. vinyl esters) non-OH-functional monomers.

Examples of suitable non-OH-functional low-Tg monomers include butyl acrylate, isobutyl acrylate, pentyl(meth) acrylate, hexyl(meth)acrylate, octyl-(meth)acrylate, 2-ethylhexyl(meth)acrylate, nonyl(meth)acrylate, decyl(meth)-acrylate, lauryl(meth)acrylate, α-olefins.

The acrylic binder preferably has a theoretical Tg of at least 230K, more preferably at least 240 K, most preferably at least 250K.

Epoxy-Functional Polyester Binder

The epoxy-functional binder component may also comprise an epoxy-functional polyester or polyether binder.

Examples for glycidyl ether and glycidyl esters are butanediol glycidyl ether, 3,4-epoxycyclohexylmethyl 3,4-epoxy-cyclohexane-carboxylate, bis(3,4-epoxycyclohexylmethyl) adipate, glycidyl ether of hydrogenated bisphenol A, where the glycidyl esters are e.g. reaction products of glycidol and carboxylic acids.

The Cross-Linker

The cross-linker can be any usual cross-linker that comprises functional groups reactive with the epoxy groups of the epoxy-functional binder. It may be a cross-linker reacting with the binder to form an ester or amine bond. Preferably, the at least one cross-linker is an acid- and/or anhydride functional cross linker. Because of the fact that the acid-epoxy reaction delivers besides the ester linkage also a hydroxyl group acid epoxy formulations may also contain crosslinkers which are used to crosslink hydroxy functional binders. Therefore, other crosslinkers such as amino-functional cross-linker or a (blocked) isocyanate-functional cross-linker can be used.

Acid-Functional Cross-Linker

The acid functional cross-linkers react with the epoxy groups of the binder to form ester groups and hydroxyl groups. Optionally, the acid functional crosslinker and/or the glycidyl functional binder may contain hydroxyl groups in order to improve the compatibility. Also, the acid functional crosslinker and/or glycidyl functional binder may contain anhydride groups. Anhydride groups will react preferably with hydroxyl groups that are eventually present giving rise to an ester group and a free acid group. The latter will react with the available epoxy groups giving rise to an ester linkage and a free hydroxyl group. Subsequently, the free hydroxyl group is available for further reaction.

These acid-functional polyester crosslinkers can be formed by the polyesterification of at least one polyalcohol with a stoichiometric excess of at least one polycarboxylic acid.

A method to form preferred acid-functional polyesters comprises reacting of the hydroxyl groups of a (precondensed) polyol with an anhydride such as phtalic anhydride, maleic anhydride, succinic anhydride, hexahydrophtalic anhydride, methyl hexahydrophtalic anhydride.

A method to form particularly preferred acid-functional polyesters comprises chain extending the polyol or polyester polyol by reaction of the hydroxyl groups of a (precondensed) polyol with chain extenders, preferably lactones such as caprolactone, valerolactone, and butyrolactone and successively reacting the chain extended polyol with an anhydride such as phtalic anhydride, maleic anhydride, succinic anhydride, hexahydrophtalic anhydride, methyl hexahydrophtalic anhydride.

Another method to form particularly preferred acid-functional polyesters comprises chain extending the carboxyl-functional polyesters by reaction of the carboxyl groups of a (precondensed) carboxyl-functional polyester with chain extenders, preferably lactones such as caprolactone, valerolactone, and butyrolactone.

Optionally, the acid-functional polyesters may comprise co-condensed monofunctional carboxylic acids, monofunctional alcohols, hydroxy acids, monofunctional epoxy compounds and/or co-reacted isocyanates.

Suitable polycarboxylic acids include phthalic anhydride, hexahydrophthalic anhydride, isophthalic acid, 1,4-cyclohexane dicarboxylic acid, adipic acid, azelaic acid, sebacic acid, dimer acid, and mixtures thereof.

Examples of suitable polyalcohols include triols such as trimethylol propane and trimethylol ethane, diols such as 1,3-propane diol, 1,4-butane diol, 2-methyl-1,3-propane diol, 2,2-dimethyl-1,3-propane diol, 2-butyl-2-ethyl-1,3-propane diol, 1,6-hexane diol, 1,4-cyclohexane dimethanol, dimer diol, and mixtures of these polyalcohols.

The optionally co-condensed monocarboxylic acid may be aliphatic, cycloaliphatic, aromatic or mixtures thereof. Preferably, the monocarboxylic acid contains 6 to 18 carbon atoms, most preferably 7 to 14 carbon atoms, such as octanoic acid, 2-ethylhexanoic acid, isononanoic acid, decanoic acid, dodecanoic acid, benzoic acid, hexahydrobenzoic acid, and mixtures thereof.

Typical hydroxy acids that can be used include dimethylol propionic acid, hydroxypivalic acid, and hydroxystearic acid.

Examples of suitable monofunctional alcohols include alcohols with 6-18 carbon atoms such as 2-ethyl hexanol, dodecanol, cyclohexanol and trimethyl cyclohexanol.

Suitable monofunctional epoxy compounds include the glycidyl esters of branched monocarboxylic acids such as Cardura® E from Resolution. Particularly in polyesters it is preferred that Cardura® E is not used in an amount of more than 25 wt % on total polyester binder weight, preferably not more than 22.5 wt %, more preferably not more than 20 wt %, even more preferably not more than 17.5 wt %, most preferably not more than 15 wt %

For efficient cross-linking it is advantageous to use an acid-functional crosslinker wherein a substantial part of the acid groups are positioned as far as possible from the carbon atom at which branching is present in the crosslinker.

Optionally, these systems based on glycidyl-functional binders and acid and/or anhydride functional crosslinkers may contain one or more polyester polyols, polyether polyols and/or polyurethane polyols.

Amino-Functional Cross-Linker

The amino functional cross-linkers which may react with the hydroxyl groups resulting from the acid-epoxy reaction or with the additional hydroxyl groups of the binder or crosslinker to form ether groups structures comprise amino resins. Amino resins are well known to the skilled artisan and are offered as commercial products by many companies. They comprise condensates of aldehydes, especially formaldehyde, with, for example, urea, melamine, guanamine, and benzoguanamine. The amino resins containing alcohol groups, preferably methylol groups, in general are partially or, preferably, fully etherified with alcohols. Use is made in particular of melamine-formaldehyde resins etherified with lower alcohols, especially with methanol or butanol. Particular preference is given to the use as cross-linkers of melamine-formaldehyde resins which are etherified with lower alcohols, especially with methanol and/or ethanol and/or butanol, and which still contain on average from 0.1 to 0.25 hydrogen atoms attached to nitrogen atoms per triazine ring.

The triazine-based cross-linkers which react with the hydroxyl groups resulting from the acid-epoxy reaction or with the additional hydroxyl groups of the binder or crosslinker to form ether groups also comprise transesterification cross-linkers, such as tris(alkoxycarbonylamino)triazine or the like, as also described, for example, in EP-A-604 922, the disclosure of which publication p. 6, ll. 1-23 and p. 6, l. 46-p. 7, l. 3 is incorporated herein by reference. As it is believed that the elastic scratch recovery may be negatively influenced by the triazine compounds, it is preferred, especially in those cases where according to the formula (I) is required to have a low $\Delta T_{g\text{-}onset}$ to achieve a low loss of gloss, that the coating composition comprises a low carbamoyl triazine content, in particular comprising less than 2.0 wt %, preferably less than 1.5 wt %, more preferably less than 1.2 wt %, even more preferably less than 1.0 wt %, and most preferably less than 0.8 wt % carbamoyl triazine on the total composition.

In preferred embodiments the cross-linker comprises an acid functional compound and/or a functionalised melamine compound and/or an isocyanate-functional compound as co-crosslinker.

(Blocked) Isocyanate-Functional Cross-Linker

Optionally, the coating composition of the invention comprises blocked isocyanate-functional cross-linkers. These compounds are based on the usual isocyanate-functional compounds known to a person skilled in the art. More preferably, the coating composition comprises cross-linkers with at least two isocyanate groups. Examples of compounds comprising at least two isocyanate groups are aliphatic, alicyclic, and aromatic isocyanates such as hexamethylene diisocyanate, 2,4,4-trimethyl hexamethylene diisocyanate, dimeric acid diisocyanate, such as DDI® 1410 ex Henkel, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis(isocyanate methyl)benzene, 1,5-dimethyl-2,4-bis(isocyanate methyl)benzene, 2,4- and 2,6-toluene diisocyanate, 2,4,6-toluene triisocyanate, $\alpha,\alpha,\alpha'$, $\alpha'$-tetramethyl o-, m-, and p-xylylene diisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates.

Other optional blocked isocyanate compounds are based on the adducts of polyisocyanates, e.g., biurets, isocyanurates, imino-oxadiazinediones, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate, available from Bayer under the trade designation Desmodur® N3390, a mixture of the uretdione and the isocyanurate of hexamethylene diisocyanate, available from Bayer under the trade designation Desmodur® N3400, the allophanate of hexamethylene diisocyanate, available from Bayer under the trade designation Desmodur® LS 2101, and the isocyanurate of isophorone diisocyanate, available from Hüls under the trade designation Vestanat® T1890. Furthermore, (co)polymers of isocyanate-functional monomers such as $\alpha,\alpha'$-dimethyl-m-isopropenyl benzyl isocyanate are suitable for use. Finally, as is known to the skilled person, the above-mentioned isocyanates and adducts thereof may be at least partly present in the form of blocked isocyanates.

For blocking the polyisocyanates it is possible in principle to employ any blocking agent which can be employed for the blocking of polyisocyanates and has a sufficiently low deblocking temperature. Blocking agents of this kind are well known to the skilled worker and need not be elucidated further here. It is possible to employ a mixture of blocked polyisocyanates which contains both isocyanate groups blocked with a first blocking agent and isocyanate groups blocked with a second blocking agent. Reference is made to WO 98/40442.

The coating compositions according to the invention may be one-component or two-component compositions. In one-component compositions all binder components and cross-linker components are mixed in one package and react to form cross-links at relatively high temperatures, in general above 100° C., usually in the presence of a catalyst. In two-component compositions the binder and cross-linker components are stored separately to avoid premature reaction. Mixing both packages is done immediately before application of the coating composition. Cross-linkers containing free isocyanates are normally used in two-component compositions. Amino resins and blocked isocyanates are examples of cross-linkers which are with normally used in one-component coating compositions.

For two-component compositions the two components are usually sold together as a kit of parts each part containing one component. Therefore, another embodiment of the invention relates to a kit of parts for the manufacture of a car wash-resistant coating, comprising a first kit part comprising at least one epoxy-functional binder selected from the group of epoxy-functional acrylic binders, epoxy-functional polyester binders or epoxy-functional polyether binders and a second kit part comprising one or more acid functional cross-linkers reactive with reactive groups of the binder, wherein in application of the binder and crosslinker kit parts a coating composition and high gloss, low LoG coating is obtained is as described above according to the invention.

The glass transition temperature of the cured coating compositions according to the invention is between 30° C. and 170° C., preferably between 40° C. and 160° C., more preferably between 50° C. and 150° C., even more preferably between 50° C. and 140° C., and most preferably between 60° C. and 130° C.

The coating composition according to the invention may comprise one or more co-binders. The co-binder can be selected from the group of acrylic binders, polyester polyols, polyether polyols, polyester polyurethane polyols, polycarbonate polyols. In two component systems the co-binder can also be a ketimine, oxazolidine, blocked amine or bicyclic orthoester binder.

In a preferred embodiment the coating composition comprises at least 25 wt % of epoxy-functional acrylic binders, based on the total amount of binder present, more preferably at least 30 wt %, even more preferably at least 35 wt %, and most preferably at least 40 wt %.

The coating compositions of the invention normally comprise (co)binders and cross-linkers in amounts such that the binder or (co)binders is/are present in an amount of from 40 to 90, preferably from 50 to 75 wt %, and the cross-linker or cross-linkers is/are present in an amount of from 10 to 60, preferably from 25 to 50 wt %, the weight percentages being based on binder+cross-linker=100 wt %.

The coating composition can contain the conventional additives and adjuvants, such as dispersing agents, dyes, accelerators for the curing reaction, pigments, and rheology modifiers. The coating composition may also comprise sag control agents like SCA available from Nuplex Resins.

The coating composition can be in a dry powder form or in liquid form. The coating composition according to the invention preferably is a liquid. The coating composition can be solvent based or water based. Preferably, the coating composition is solvent based. The coating composition preferably comprises less than 780 g/l of volatile organic solvent based on the total composition, more preferably less than 420 g/l, most preferably less than 250 g/l.

The coating composition according to the present invention is preferably used as a clear coat in a so-called base coat/clear coat system or as a pigment-free top coat. Use of the coating compositions according to the invention as a clear coat or top coat may prevent the clear coat or top coat suffering car wash-induced optical defects, such as a loss of gloss and loss of DOI (distinctness of image). The base coat used in the base coat/clear coat system can for instance be a one-component or a two-component system. The base coat can be physically drying or chemically drying. The base coat can be water borne or solvent borne.

The coating composition according to the invention can be applied to a substrate in any desirable manner, such as by roller coating, spraying, brushing, sprinkling, flow coating, dipping, electrostatic spraying, or electrophoresis, preferably by spraying, most preferably by electrostatic spraying.

Suitable substrates can be of metal, synthetic material (plastics), optionally pretreated, e.g., with a primer, a filler, or as indicated above for a clear coat, with a base coat. Curing may be carried out at ambient temperature or, optionally, at elevated temperature to reduce the curing time. Preferably, the coating composition may be baked at higher temperatures in the range of, for instance, 60 to 160° C., in a baking oven over a period of 10 to 60 minutes. Curing can also be induced by actinic light radiation, such as UV light, IR light, NIR light, when mixed with suitable reactive compounds and additives known to the person skilled in the art. The clear coat can be applied on the base coat wet-on-wet. Optionally, the base coat may be partially cured prior to the application of the clear coat. Also, the base coat may be fully cured prior to the application of the clear coat.

The compositions of the present invention are particularly suitable in the first finishing of automobiles and motorcycles. The compositions can also be used in the preparation of coated metal substrates, such as in the refinish industry, in particular the body shop, to repair automobiles and transportation vehicles, and in finishing large transportation vehicles such as trains, trucks, buses, and aeroplanes.

The invention will be further described in the following examples, which must not be construed as limiting the scope of the present invention.

Specification of Terms:
Setamine® US 138 BB-70: butylated melamine resin ex Akzo Nobel
Setalux® 8503 SS-60: glycidylmethacrylate containing acrylic resin ex Akzo Nobel
Tinuvin® 328: UV light stabiliser ex Ciba Specialty Chemicals
Trigonox® 21S: tert-butyl peroxy octanoate ex Akzo Nobel
Trigonox® B: di-tert-butyl peroxide ex Akzo Nobel
BYK® 306: Flow additive ex Byk-Chemie
BYK® 331: flow additive ex Byk-Chemie
Desmodur® N 3390: Polyisocyanate hardener ex Bayer AG
Dowanol® PM acetate: Methoxypropyl acetate solvent ex Dow Chemicals
Armeen® DM 12D: catalyst (N,N-dimethyldodecylamine) ex Akzo Nobel Chemicals
Cymel® 303: crosslinker (Methylolated melamine-formaldehyde resin) ex Cytec
ERL-4299: epoxy hardener (Bis(3,4-epoxycyclohexylmethyl)adipate) ex Union Carbide
Dow Corning 200: levelling agent ex Dow Corning

BINDER EXAMPLE 1

Setalux® 8503 SS-60, a glycidylmethacrylate functional binder ex Akzo Nobel Resins bv.

BINDER EXAMPLE 2

A steel reaction vessel equipped with a stirrer, a thermocouple, a condenser, a nitrogen inlet, and an addition port was charged with 1366 g butyl acetate and 23.50 g cumene hydroperoxide and heated to 160° C. and a pressure of about 2.5 bar. A mixture of 620.1 g glycidylmethacrylate, 284.7 g butyl acrylate, 202.4 g 2-hydroxyethyl methacrylate, 807.9 g styrene, 414.2 g ethylhexylacrylate and 151.1 g ethylhexylmethacrylate, 31 g Trigonox® B and 48 g of butyl acetate was gradually pumped into the reaction vessel during 5 hours. After the addition the monomer vessel, pump and tube was rinsed with 61.9 g of butyl acetate. The reaction mixture was kept at 160° C. for three hours and finally cooled down to 80° C. and diluted with butyl acetate to a solids content of 60% and filtered. The resultant product had a weight average molecular weight of 8144, a polydispersity of 2.59 and a calculated hydroxyl number of 35 mg KOH/g on solid resin.

BINDER EXAMPLE 3

A steel reaction vessel equipped with a stirrer, a thermocouple, a condenser, a nitrogen inlet, and an addition port was charged with 1366 g butyl acetate and 23.50 g cumenehydroperoxide and heated to 160° C. and a pressure of about 2.5 bar. A mixture of 880.5 g glycidylmethacrylate, 770.4 g butyl acrylate, 202.4 g 2-hydroxyethyl methacrylate, 496.1 g styrene, and 131.0 g butylmethacrylate, 31 g Trigonox® B and 48 g of butyl acetate was gradually pumped into the reaction vessel during 5 hours. After the addition the monomer vessel, pump and tube was rinsed with 61.9 g of butyl acetate. Next 30 minutes after the main dosing a mixture of 6.20 g Trigonox® 21S and 6.2 g butyl acetate was pumped into the reaction vessel. The reaction mixture was kept on temperature for one hour and then cooled down to 90° C. and filtered. The resultant product had a weight average molecular weight of 5563, a polydispersity of 2.16 and a calculated hydroxyl number of 35 mg KOH/g on solid resin.

BINDER EXAMPLE 4

A steel reaction vessel equipped with a stirrer, a thermocouple, a condenser, a nitrogen inlet, and an addition port was charged with 1366 g butyl acetate and 23.50 g cumenehydroperoxide and heated to 160° C. and a pressure of about 2.5 bar. A mixture of 1176.0 g glycidylmethacrylate, 780.6 g butyl acrylate, 202.4 g 2-hydroxyethyl methacrylate and 321.7 g styrene, 24.8 g Trigonox® B and 48 g of butyl acetate was gradually pumped into the reaction vessel during 5 hours. After the addition the monomer vessel, pump and tube was rinsed with 61.9 g of butyl acetate. Next, 30 minutes after the end of the main dosing a mixture of 6.20 g Trigonox® 21S and 6.2 g butyl acetate was pumped into the reaction vessel and rinsed with 31 g of butyl acetate. The reaction mixture was kept at temperature for one hour. Next, 90 minutes after the end of the main dosing again a mixture of 6.20 g Trigonox® 21S and 6.2 g butyl acetate was pumped into the reaction vessel and rinsed with 31 g of butyl acetate. The reaction mixture was kept at temperature for one hour and then cooled down to 90° C. and filtered. The resultant product had a weight average molecular weight of 5477, a polydispersity of 2.22 and a calculated hydroxyl number of 35 mg KOH/g on solid resin.

BINDER EXAMPLE 5

A steel reaction vessel equipped with a stirrer, a thermocouple, a condenser, a nitrogen inlet, and an addition port was charged with 1366 g methoxypropyl acetate and 23.50 g cumenehydroperoxide and heated to 175° C. and a pressure of about 2.5 bar. A mixture of 1176.0 g glycidylmethacrylate, 780.6 g butyl acrylate, 202.4 g 2-hydroxyethyl methacrylate and 321.7 g styrene, 62 g Trigonox® B and 62 g of methoxypropyl acetate was gradually pumped into the reaction vessel during 5 hours. After the addition the monomer vessel, pump and tube was rinsed with 61.9 g of methoxypropyl acetate. Next, 30 minutes after the end of the main dosing a mixture of 6.20 g Trigonox® 21S and 6.2 g methoxypropyl acetate was pumped into the reaction vessel and rinsed with 31 g of methoxypropyl acetate. The reaction mixture was kept at temperature for one hour. Next, 90 minutes after the end of the main dosing again a mixture of 6.20 g Trigonox® 21S and 6.2 g methoxypropyl acetate was pumped into the reaction vessel and rinsed with 31 g of methoxypropyl acetate. The reaction mixture was kept at temperature for one hour and then cooled down to 90° C. and filtered. The resultant product had a weight average molecular weight of 2564, a polydispersity of 1.92 and a calculated hydroxyl number of 35 mg KOH/g on solid resin.

BINDER EXAMPLE 6

A steel reaction vessel equipped with a stirrer, a thermocouple, a condenser, a nitrogen inlet, and an addition port was charged with 1366 g methoxypropyl acetate and 23.50 g cumenehydroperoxide and heated to 175° C. and a pressure of about 2.5 bar. A mixture of 880.5 g glycidylmethacrylate, 770.4 g butyl acrylate, 131.0 g butyl methacrylate, 202.4 g 2-hydroxyethyl methacrylate and 496.1 g styrene, 62 g Trigonox® B and 61.5 g of methoxypropyl acetate was gradually pumped into the reaction vessel during 5 hours. After the addition the monomer vessel, pump and tube was rinsed with 61.9 g of methoxypropyl acetate. Next, 30 minutes after the end of the main dosing a mixture of 6.20 g Trigonox® 21S and 6.2 g methoxypropyl acetate was pumped into the reaction vessel and rinsed with 31 g of methoxypropyl acetate. The reaction mixture was kept at temperature for one hour. Next, 90 minutes after the end of the main dosing again a mixture of 6.20 g Trigonox® 21S and 6.2 g methoxypropyl acetate was pumped into the reaction vessel and rinsed with 31 g of methoxypropyl acetate. The reaction mixture was kept at temperature for one hour and then cooled down to 90° C. and filtered. The resultant product had a weight average molecular weight of 2837, a polydispersity of 1.87 and a calculated hydroxyl number of 35 mg KOH/g on solid resin.

CROSSLINKER EXAMPLE 7

This sample is a rework of U.S. Pat. No. 4,703,101 example F. A polyacid half-ester of trimethylolpropane and methylhexahydrophtalic anhydride was prepared from the following mixture: 514.9 g of trimethylolpropane, 1935 g of methylhexahydrophtalic anhydride and 1050 g of methyl isobutyl ketone. The trimethylolpropane and the methyl isobutyl ketone were charged to a suitable reaction vessel and heated under a nitrogen atmosphere to 115° C. The methylhexahydrophtalic anhydride was charged over a 2-hour period while maintaining the temperature between 112° C.-117° C. The reaction mixture was held at this temperature for about 3 hours. The reaction product was then cooled to room temperature and had a solids content of 70.2% and an acid value (on solids) of 287 mg KOH/g and an average number molecular weight of 511 and a polydispersity of 1.13.

CROSSLINKER EXAMPLE 8

A polyacid half-ester was prepared as follows: 1290 g of methyl isobutyl ketone, 400.2 g of trimethylolpropane and 0.1 g of dibutyltindilaurate were charged to a suitable steel reactor and heated to 150° C. at a presssure of about 2.8 bar. Next 1029 g of ε-caprolacton was gradually pumped into the reaction vessel during 2 hours. After the addition the vessel, pump and tube was rinsed with 30 g of methyl isobutyl ketone and the reaction mixture was kept at 150° C. during 4 hours. Then the reaction mixture was cooled to 80° C. and filtered. Next 916 g of this solution of the intermediate product was charged to a suitable reaction vessel and heated under a nitrogen atmosphere to 115° C. 504.3 g of methylhexahydrophtalic anhydride was charged over a 2-hour period while maintaining the temperature between 112° C.-117° C. and dosing vessel was rinsed with 10 g of methyl isobutyl ketone and added to the reaction mixture. The reaction mixture was held at this temperature for about 3 hours. The reaction product was then cooled to 80° C. and filtered. The reaction product had a solids content of 63.2% and an acid value (on solids) of 198 mg KOH/g and an average number molecular weight of 1031 and a polydispersity of 1.20.

CROSSLINKER EXAMPLE 9

916 g of the solution of the intermediate product from crosslinker sample 7 was charged to a suitable reaction vessel and heated under a nitrogen atmosphere to 115° C. 300.3 g of succinic anhydride was charged over a 2-hour period (in equal portions every 15 minutes) while maintaining the temperature between 112° C.-117° C. At the end 10 g of methyl isobutyl ketone was added to the reaction mixture. The reaction mixture was held at 115° C. for about 3 hours. The reaction product was then cooled to 80° C. and filtered. The reaction product had a solids content of 58.8% and an acid value (on solids) of 259 mg KOH/g and an average number molecular weight of 1053 and a polydispersity of 1.30.

CROSSLINKER EXAMPLE 10

A polyacid half-ester of di-trimethylolpropane and methylhexahydrophtalic anhydride was prepared from the following mixture: 300 g of di-trimethylolpropane, 806.4 g of methylhexahydrophtalic anhydride and 400 g of methyl isobutyl ketone. The di-trimethylolpropane and the methyl isobutyl ketone were charged to a suitable reaction vessel and heated under a nitrogen atmosphere to 115° C. The methylhexahydrophtalic anhydride was charged over a 2-hour period while maintaining the temperature between 112° C.-117° C. The dosing vessel was rinsed with 74 g of methyl isobutyl ketone and added to the reactor. The reaction mixture was held at this temperature for about 3 hours. The reaction product was then cooled to 80° C. and filtered. The reaction product had a solids content of 69.8% and an acid value (on solids) of 253 mg KOH/g and an average number molecular weight of 906 and a polydispersity of 1.06.

CROSSLINKER EXAMPLE 11

250 g of di-trimethylolpropane, 228 g of ε-caprolacton and 0.1 g of dibutyltindilaurate were charged to a suitable reaction vessel and heated under a nitrogen atmosphere to 150° C. The reaction mixture was kept for 4 hours on this temperature and then cooled to 115° C. 400 g of methyl isobutyl ketone was added and then 672 g of methylhexahydrophtalic anhydride was charged over a 2-hour period while maintaining the temperature between 112° C.-117° C. The dosing vessel was rinsed with 92 g of methyl isobutyl ketone and added to the reactor. The reaction mixture was held at 115° C. for about 3 hours. The reaction product was then cooled to 80° C. and filtered. The reaction product had a solids content of 72.0% and an acid value (on solids) of 201 mg KOH/g and an average number molecular weight of 1304 and a polydispersity of 1.13.

CROSSLINKER EXAMPLE 12

400 g of methyl isobutyl ketone and 336 g of Polyol PP30 of Perstorp were charged to a suitable reaction vessel and heated under a nitrogen atmosphere to 115° C. Then 806.4 g of methylhexahydrophtalic anhydride was charged over a 2-hour period while maintaining the temperature between 112° C.-117° C. The dosing vessel was rinsed with 90 g of methyl isobutyl ketone and added to the reactor. The reaction mixture was held at 115° C. for about 3 hours. The reaction product was then cooled to 80° C. and filtered. The reaction product had a solids content of 70.2% and an acid value (on solids) of 245 mg KOH/g and an average number molecular weight of 943 and a polydispersity of 1.09.

CROSSLINKER EXAMPLE 13

201 g of trimethylolpropane, 171 g of ε-caprolacton and 0.1 g of dibutyltindilaurate were charged to a suitable reaction vessel and heated under a nitrogen atmosphere to 150° C. The reaction mixture was kept for 4 hours on this temperature and then cooled to 115° C. 400 g of methyl isobutyl ketone was added and then 504 g of methylhexahydrophtalic anhydride was charged over a 2-hour period while maintaining the temperature between 112° C.-117° C. The dosing vessel was rinsed with 40 g of methyl isobutyl ketone and added to the reactor. The reaction mixture was held at 115° C. for about 3 hours. The reaction product was then cooled to 100° C. and 252 g of hexamethylene diisocyanate was added during one hour filtered. The dosing vessel was rinsed with 43 g of methyl isobutyl ketone and added to the reaction mixture. The reaction mixture was heated to 115° C. and kept at that temperature during 45 minutes and then cooled to 80° C. and filtered. The reaction product had a solids content of 71.7% and an acid value (on solids) of 145 mg KOH/g and an average number molecular weight of 1463 and a polydispersity of 1.96.

CROSSLINKER EXAMPLE 14

Crosslinker example 14 is Pripol® 1040 of Uniqema.

Coating Compositions 1-9

The appropriate binders were mixed with the appropriate crosslinkers according to Table 1 and on 100 parts of solid paint 1.0 part of the catalyst N,N-dimethylethanolamine, 0.1 part of Byk® 306, 0.15 parts of Byk® 331 and 3.0 parts of Tinuvin® 328 was added and mixed. The paint was diluted with Dowanol® PM acetate till 28 s DIN cup4 at 23° C.

COMPARATIVE COATING COMPOSITION EXAMPLE 1

74.8 g (solids) of Setalux 8503 SS-60, 25.2 g (solids) of Crosslinker example 7, 1.0 g of N,N-dimethylethanolamine, 0.1 g of BYK® 306, 0.15 g of BYK® 331 and 3.0 g of Tinuvin® 328 were mixed and then diluted with Dowanol® PM acetate to spray viscosity (28 seconds DIN 4 cup, 23° C.).

COMPARATIVE COATING COMPOSITION EXAMPLE 2

57.5 g (solids) of Binder example 5, 42.5 g (solids) of Crosslinker example 10, 1.0 g of N,N-dimethylethanolamine, 0.1 g of BYK® 306, 0.15 g of BYK® 331 and 3.0 g of Tinuvin® 328 were mixed and then diluted with Dowanol® PM acetate to spray viscosity (28 seconds DIN 4 cup, 23° C.).

COMPARATIVE COATING COMPOSITION EXAMPLE 3

59.9 g (solids) of Binder example 2, 31 g (solids) of Crosslinker example 8, 9.1 g (solids) Setamine US-138 BB-70, 1.0 g of N,N-dimethylethanolamine, 0.1 g of BYK® 306, 0.15 g of BYK® 331 and 3.0 g of Tinuvin® 328 were mixed and then diluted with Dowanol® PM acetate to spray viscosity (28 seconds DIN 4 cup, 23° C.).

Coating compositions were spray applied to electrocoated steel panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 30 minutes at 140° C.

The car wash resistance was determined with the aid of a mini-car wash device according to Renault specification RNUR 2204—C.R. PO No 2204. In this test the coated panel is subjected for 10 minutes to a rotating washing brush similar to the ones used in a commercial car wash. During this operation a slurry of aluminium oxide paste Durmax 24H from Prolabo Paris is continuously sprayed over the panel. The loss of gloss is taken as a measure of the car wash resistance. The Observed Loss of Gloss is defined as follows: Observed Loss of Gloss=(initial gloss−final gloss)/initial gloss*100%. The Initial gloss is defined as the gloss of the cured coating before the car wash test. The Final gloss is defined as the gloss of the cured coating after the car wash test. Gloss was measured in accordance with ISO 2813 using a Haze Gloss apparatus from Byk Gardner GmbH. The time elapsed between the car wash test and the loss of gloss measurement was about 1-3 hours. All samples were stored at room temperature between the car wash test and the gloss measurement.

For DMTA measurements a free standing coating film was prepared by applying the coating composition on polypropylene panels in a wet layer thickness of 100 microns using a doctor blade. After a 10-minute flash-off period the panels were baked for 30 minutes at 140° C. The cured coating can readily be peeled off the polypropylene panel to produce a free standing film of coating. From the free standing film a sample was cut for DMTA measurements of 3 mm width and at least 30 mm length. The length between the clamps of the tensile bench of the DMTA was 30 mm. A DMTA measurement was performed at 11 Hz and a heating rate of 5° C./min, from which the onset of the glass transition temperature $Tg_{onset}$ (in K), the width of the glass transition temperature /)ΔTg (in ° C.), and the cross-link density parameter X (in kPa/K) were evaluated as described above. The loss of gloss (LoG) was calculated using the formula (I). Further, the various coating composition parameters were determined, in particular Mn, MF, NCO, AVX, CI, EEW and IPF, where appropriate, determined as described above. All results are summarised in Table 2 and 3.

It is clearly demonstrated that the coating compositions based on the coating compositions of Examples 1-9 have a lower observed loss of gloss and hence an improved car wash resistance compared to the coating compositions of Comparative examples 1, 2, and 3. The calculated loss of gloss LoG according to formula (I) accurately predicts the observed loss of gloss values. Also the L values according to formula (II) accurately predict those compositions leading to a low observed loss of gloss.

COMPARATIVE COATING COMPOSITION EXAMPLE 4

The coating composition of the prior art patent U.S. Pat. No. 4,764,430 was reworked. The epoxy-containing acrylic polymer was a rework of Example A and trimethylolpropane methylhexahydrophtalic anhydride was a rework of Example C. 3.0 g Tinuvin 328, 46.9 g methyl isobutyl ketone, 1.0 g Dow Corning 200, 16.8 g ERL-4299, 2.0 g Armeen DM 12D, 53.4 g of an epoxy-containing acrylic polymer (with a solids content of 56.9%), 20.4 g of Cymel 303, 41.0 g of trimethylolpropane methylhexahydrophtalic anhydride (with a solids content of 80.0%) and 10.0 g of 2-ethylhexanoic acid were mixed. The resultant formulated coating composition contained 56 percent resin solids and had a No. 4 Ford cup viscosity of 16 seconds.

The clear coat formulation was applied in two coats on a solvent borne blue base coat with a 90 second flash off at room temperature between the coats. After the second clear coat had been applied, the coating was given an air flash for five minutes and then baked (panel in horizontal position) for 30 minutes 140° C. and tested on carwash resistance.

The same clear coat formulation was also sprayed on polypropylene (PP) panels using the same spraying and curing conditions. The clear coat could be untied from the PP panels for doing the DMTA analysis. The initial gloss of the clear coat of the carwash panels was 82 GU (gloss units). After carwash an end gloss of 53 GU was found which means an observed loss of gloss of 0.35. The following parameters were found for the clear coat: Tg onset was 58° C., ΔTg was 23° C. and the crosslink density was 8.8 kPa/K. Based on these measured DMTA data a LoG (using formula 1 in claim 1) of 0.44 was calculated. A xylene test was done to test the chemical resistance. Already after 1 minute the coating started to swell. Clearly, the prior art coating has an inferior car wash resistance and chemical resistance.

TABLE 1

| PAINT FORMULATIONS: | | Coating examples | | | | | | | | | Comparative examples | | |
|---|---|---|---|---|---|---|---|---|---|---|---|---|---|
| | | 1 | 2 | 3 | 4 | 5 | 6 | 7 | 8 | 9 | 1 | 2 | 3 |
| Binder example 1 | (s) | 65.9 | | 65.8 | | | | | | 59.8 | 74.8 | | 66.2 |
| Binder example 2 | (s) | | 65.9 | | | | | | | | | | |
| Binder example 3 | (s) | | | | | | | | | | | | |
| Binder example 4 | (s) | | | | 56.7 | | | | | | | | |
| Binder example 5 | (s) | | | | | | 51.8 | 56.7 | 43.7 | | | 57.5 | |
| Binder example 6 | (s) | | | | | 58.9 | | | | | | | |
| Crosslinker example 7 | (s) | | | | | | | | | | 25.2 | | 24.7 |
| Crosslinker example 8 | (s) | 34.1 | 34.1 | | | | | | | | | | |
| Crosslinker example 9 | (s) | | | | | | | | | | | | |
| Crosslinker example 10 | (s) | | | | | | | | | | | 42.5 | |
| Crosslinker example 11 | (s) | | | | | | 41.1 | 48.2 | | | | | |
| Crosslinker example 12 | (s) | | | | 43.3 | | | | 43.3 | | | | |
| Crosslinker example 13 | (s) | | | | | | | | 56.3 | | | | |
| Crosslinker example 14 | (s) | | | 34.2 | | | | | | 31.1 | | | |
| Setamine ® US-138 BB-70 | (s) | | | | | | | | | | | | 9.1 |
| Desmodur ® N3390 | (s) | | | | | | | | | 9.1 | | | |
| N,N-dimethylethanolamine | | 1 | 1 | 1 | 1 | 1 | 1 | 1 | 1 | 1 | 1 | 1 | 1 |
| Byk ® 306 | | 0.1 | 0.1 | 0.1 | 0.1 | 0.1 | 0.1 | 0.1 | 0.1 | 0.1 | 0.1 | 0.1 | 0.1 |
| Byk ® 331 | | 0.15 | 0.15 | 0.15 | 0.15 | 0.15 | 0.15 | 0.15 | 0.15 | 0.15 | 0.15 | 0.15 | 0.15 |
| Tinuvin ® 328 | | 3 | 3 | 3 | 3 | 3 | 3 | 3 | 3 | 3 | 3 | 3 | 3 |
| Dowanol ® PM acetate till 28 s DIN cup 4/23 C | | ... | ... | ... | ... | ... | ... | ... | ... | ... | ... | ... | ... |
| Ratio Epoxy:acid | | 10:9 | 10:9 | 1:1 | 1:1 | 1:1 | 1:1 | 1:1 | 1:1 | 1:1 | 1:1 | 1:1 | 1:1 |

TABLE 2

| Coating | Binder Ex. Nr | Crosslinker Ex. Nr. | Mn | LPF | EEW | CL | AVX exp. | MF | NCO mmol/g |
|---|---|---|---|---|---|---|---|---|---|
| Example 1 | 1 | 8 | 2777 | 0.227 | 569 | 0.0884 | 198 | 0 | 0 |
| Example 2 | 2 | 8 | 3144 | 0.226 | 569 | 0.0884 | 198 | 0 | 0 |
| Example 3 | 1 | 14 | 2777 | 0.227 | 569 | 0.0257 | 287 | 0 | 0 |
| Example 4 | 4 | 12 | 2467 | 0.178 | 300 | 0 | 245 | 0 | 0 |
| Example 5 | 6 | 11 | 1517 | 0.214 | 401 | 0.0771 | 201 | 0 | 0 |
| Example 6 | 5 | 11 | 1335 | 0.163 | 300 | 0.0904 | 201 | 0 | 0 |
| Example 7 | 5 | 12 | 1335 | 0.178 | 300 | 0 | 245 | 0 | 0 |
| Example 8 | 5 | 13 | 1335 | 0.138 | 300 | 0.1346 | 145 | 0 | 0 |
| Example 9 | 1 | 14 | 2777 | 0.206 | 569 | 0.2274 | 190 | 0 | 0.47 |
| Comparative ex. 1 | 1 | 7 | 2777 | 0.258 | 569 | 0.019 | 287 | 0 | 0 |
| Comparative ex. 2 | 5 | 10 | 1335 | 0.181 | 300 | 0.0442 | 253 | 0 | 0 |
| Comparative ex. 3 | 1 | 7 | 2777 | 0.227 | 569 | 0.019 | 287 | 0.1 | 0 |

TABLE 3

| Coating | Binder Ex. Nr | Crosslinker Ex. Nr. | ΔTg (° C.) | Tg onset K | X kPa/K | Initial gloss | LoG % Observed | LoG fitted | L |
|---|---|---|---|---|---|---|---|---|---|
| Example 1 | 1 | 8 | 24 | 317 | 10.7 | 86 | 15 | 0.12 | 0.15 |
| Example 2 | 2 | 8 | 29 | 316 | 11.4 | 86 | 16 | 0.12 | 0.15 |
| Example 3 | 1 | 14 | 29 | 291 | 7.1 | 84 | 8 | 0.08 | 0.17 |
| Example 4 | 4 | 12 | 27 | 344 | 45.3 | 83 | 18 | 0.24 | 0.21 |
| Example 5 | 6 | 11 | 26 | 321 | 16.3 | 84 | 12 | 0.15 | 0.17 |
| Example 6 | 5 | 11 | 25 | 327 | 23.7 | 84 | 17 | 0.20 | 0.20 |
| Example 7 | 5 | 12 | 25 | 331 | 25.7 | 83 | 14 | 0.2496 | 0.10 |
| Example 8 | 5 | 13 | 24 | 330 | 25.8 | 84 | 18 | 0.24 | 0.19 |
| Example 9 | 1 | 14 | 29 | 301 | 7.9 | 87 | 7 | 0.09 | 0.11 |
| Comparative ex. 1 | 1 | 7 | 27 | 340 | 11.8 | 86 | 51 | 0.54 | 0.49 |

TABLE 3-continued

| Coating | Binder Ex. Nr | Crosslinker Ex. Nr. | ΔTg (° C.) | Tg onset K | X kPa/K | Initial gloss | LoG % Observed | LoG fitted | L |
|---|---|---|---|---|---|---|---|---|---|
| Comparative ex. 2 | 5 | 10 | 24 | 347 | 27.9 | 84 | 33 | 0.32 | 0.28 |
| Comparative ex. 3 | 1 | 7 | 37 | 352 | 30 | 87 | 36 | 0.34 | 0.33 |

The invention claimed is:

1. Coating composition for the manufacture of a car wash-resistant coating, comprising:
at least one epoxy-functional binder selected from the group of epoxy-functional acrylic binders, epoxy-functional polyester binders or epoxy-functional polyether binders; and
one or more acid functional cross-linkers, and optionally at least one of: anhydride, amino and isocyanate functional cross-linkers, wherein the cross-linkers are reactive with reactive groups of the binder,
wherein the binder and cross-linker are selected such that, after curing to a coating, the coating has an initial gloss of at least 81 GU and a loss of gloss (LoG) of less than 0.25, and
wherein, in case the binder is an acrylic binder, the acrylic binder comprises:
at least 20 weight percent based on the total weight of monomers of epoxy group-containing monomers,
more than 10 mole percent of monomers selected from a group of non-epoxy-functional low Tg monomers with a monomer Tg not exceeding 253K for acrylic non-epoxy-functional monomers, or not exceeding 293 K for methacrylic or non-acrylic non-epoxy-functional monomers, and
an average epoxy equivalent weight value of between 200 and 700 g/mol, and a free surplus hydroxyl value less than 30 mg KOH/g solid coating.

2. The composition of claim 1, wherein the loss of gloss is determined by the formula $$L = A1 + A2*Mn + A3*LPF + A4*EEW + A5*CL + A6*AVX + A7*MF + A8*NCO + A9*Mn*CL + A10*Mn*AVX + A11*Mn*MF + A12*(LPF)^2$$

wherein L represents the observed loss of gloss of the coating composition, Mn represents the number average molecular weight of all epoxy functional binders in the composition,
LPF is the weight averaged low polar fraction of low-Tg monomers in the epoxy-functional acrylic binder,
EEW is the average epoxy equivalent weight,
CL is the carbon length of the crosslinkers,
AVX is the weight averaged acid value of the acid functional crosslinker,
MF is the weight fraction of the amino cross-linker on total solids in the coating composition,
NCO is defined as the total concentration of NCO groups present in the cured coating composition expressed in mmole NCO groups/g,
A1=0.479, A2=0.000932, A3=−28.103, A4=−0.000858, A5=6.788, A6 =0.00920, A7=−7.003, A8=0.391, A9=−0.00269, A10=−0.00000343, A11=0.00311, and A12=79.122.

3. The coating composition of claim 1, wherein the coating is substantially siloxane-free.

4. The coating composition of claim 1, wherein the coating is substantially pigment-free.

5. The coating composition of claim 1, wherein the coating is substantially free of nanoscopic particles.

6. The coating composition of claim 1, wherein the crosslinker further comprises a functionalised melamine compound.

7. The coating composition of claim 1, wherein the crosslinker further comprises an isocyanate- or blocked-isocyanate functional compound.

8. The coating composition of claim 1, wherein the crosslinker comprises a lactone as a chain extender.

9. The composition of claim 8, wherein the crosslinker comprises ε-caprolactone as a chain extender.

10. The coating composition of claim 1, wherein the coating is a pigment-free top coat or a clear coat.

11. The coating composition of claim 1, wherein the coating at least partly coats body parts of motorcycles, cars, trains, buses, trucks, and aeroplanes.

12. The composition of claim 1, wherein the loss of gloss is determined by the formula:

$$\text{LoG} = (1 - e^{(A/X)})/(1 + e^K) + (1 - e^{D*\Delta Tg})$$

wherein $K = B*(Tg_{onset} - C)$
A=−8.03, B=−0.21, C=328 and D=−0.00304.
X reflects the cross-link density parameter in kPa/K,
$Tg_{onset}$ is the onset temperature of the Tg transition in K, and
ΔTg the width of the glass transition temperature in K,
wherein X, $Tg_{onset}$, and ΔTg are determined in a Dynamic Mechanical Thermal Analysis (DMTA) test at 11 Hz and a heating rate of 5° C./min.

13. The coating composition of claim 12, wherein the ΔTg of the coating is less than 70° C.

14. The coating composition of claim 12, wherein after curing the coating has a cross-link density parameter X between 7 and 45 kPa/K.

15. A kit of parts for the manufacture of a car wash-resistant coating, comprising a first part comprising at least one acid functional cross-linker and a second part comprising at least one epoxy-functional binder, which when combined form a coating composition according to claim 1.

16. A method to prepare a car wash-resistant coating, comprising:
applying the composition of claim 1 to a substrate and curing the composition, wherein after curing the coating has an initial gloss of at least 81 GU and a loss of gloss (LoG) of less than 0.25.

17. The method of claim 16 wherein the coating is cured at a temperature of at least 60° C.

18. The method of claim 16, further comprising reacting the at least one acid-functional crosslinker with a chain extender at least one of before and during curing.

* * * * *